United States Patent
Dinkel et al.

(10) Patent No.: US 9,274,905 B1
(45) Date of Patent: Mar. 1, 2016

(54) CONFIGURATION TESTS FOR COMPUTER SYSTEM

(75) Inventors: William Joseph Dinkel, Santa Clara, CA (US); James R Curtis, Placerville, CA (US); John DeFranco, San Jose, CA (US); Vijayanand Maram, Santa Clara, CA (US); Charles J Carlino, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1634 days.

(21) Appl. No.: 12/688,547

(22) Filed: Jan. 15, 2010

(51) Int. Cl.
*G06F 11/00* (2006.01)
*G06F 11/20* (2006.01)

(52) U.S. Cl.
CPC ........ *G06F 11/2023* (2013.01); *G06F 11/2028* (2013.01)

(58) Field of Classification Search
USPC ................................. 714/37, 2, 45
See application file for complete search history.

(56) References Cited

U.S. PATENT DOCUMENTS

| | | | |
|---|---|---|---|
| 5,343,478 A | 8/1994 | James et al. | |
| 5,423,050 A | 6/1995 | Taylor et al. | |
| 5,689,726 A | 11/1997 | Lin | |
| 5,864,660 A | 1/1999 | Hamameh et al. | |
| 6,081,864 A | 6/2000 | Lowe et al. | |
| 6,085,244 A | 7/2000 | Wookey | |
| 6,282,640 B1 | 8/2001 | Klein | |
| 6,467,054 B1* | 10/2002 | Lenny | 714/42 |
| 6,543,047 B1 | 4/2003 | Vrhel, Jr. et al. | |
| 6,598,223 B1 | 7/2003 | Vrhel, Jr. et al. | |
| 6,772,083 B2 | 8/2004 | Müller et al. | |
| 6,934,880 B2* | 8/2005 | Hofner | 714/10 |
| 7,159,151 B2* | 1/2007 | Morgan et al. | 714/43 |
| 2009/0217061 A1* | 8/2009 | Yamamoto et al. | 713/300 |
| 2009/0222498 A1* | 9/2009 | Lu et al. | 707/204 |
| 2010/0115342 A1* | 5/2010 | Shigeta et al. | 714/37 |
| 2011/0055636 A1* | 3/2011 | DeHaan et al. | 714/37 |
| 2011/0055669 A1* | 3/2011 | DeHaan et al. | 714/799 |

* cited by examiner

*Primary Examiner* — Sarai Butler
(74) *Attorney, Agent, or Firm* — Clifton L. Anderson

(57) ABSTRACT

A computer system has a managing server for managing one or more managed nodes. The managed nodes have media encoded with test executables executable on their respective nodes. The test executables can check configuration data for the node and/or check whether external resources are accessible from the node. The managing server issues commands to run the test executables and collects test results returned by the test executables.

20 Claims, 3 Drawing Sheets

CONFIGURATION TESTS FOR COMPUTER SYSTEM

BACKGROUND

In a managed computer system, a managing server can manage a plurality of managed nodes, e.g., servers. A managing server can have access to a database that includes configuration and other information about the nodes and their hardware and software environment. Entry of the information into the configuration database can be automated or manual or both.

In either case, a problem can occur where the database information is not up-to-date or is otherwise inaccurate. For example, some centrally managed systems provide for a "fail-over", where, in the event of a failure of a managed node, its functionality is migrated to a still working managed node. The managing server may identify a suitable fail-over node based on the configuration information in the database. If the configuration information in the database is inaccurate, the fail-over may itself fail, causing an extended interruption in service.

A managing server can use a procedure that checks the configuration database against the actual configuration of the nodes and their hardware/software environment. There may be various aspects to be checked for each node including what operating system or systems are running, what applications are installed, are the installed applications active or inactive, what is the hardware configuration, what external hardware and software resources are accessible, etc. The procedure can check each item in the configuration database and run a test on each managed node to determine if the database needs updating or other corrective action needs to be taken.

DETAILED DESCRIPTION

Figure 1:
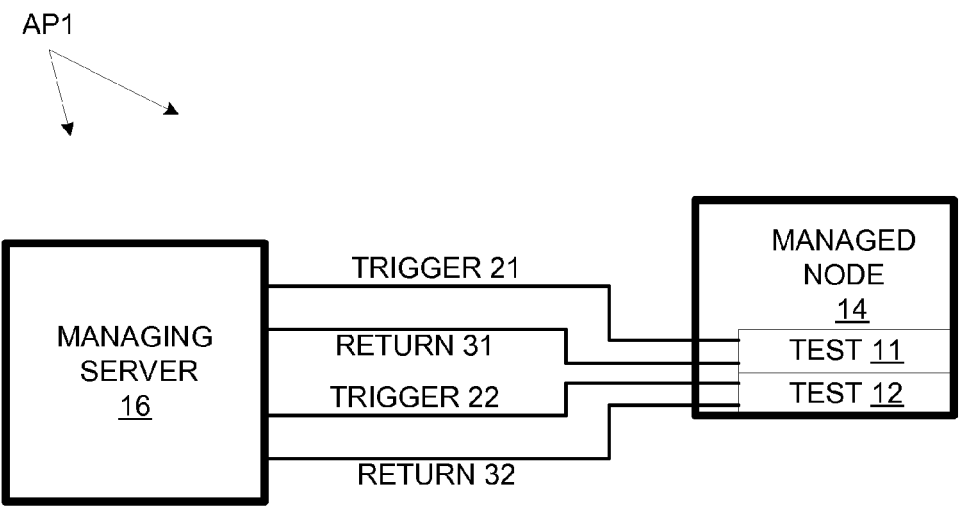
FIG. 1 is a schematic diagram of a managed computer system in accordance with an embodiment.

A computer system AP1 provides for plural independent tests 11 and 12 on a managed node 14. By "independent" is meant that each test is a separate executable file or script so that it can be removed or added without affecting other tests. A managing server 16 (e.g., a central management server or a designated managing server in a cluster) can issue trigger commands 21 and 22 for the respective tests, either concurrently or at distinct times. In response to a trigger command 21, 22, the respective test 11, 12 is executed so as to return configuration or other management-related data 31, 32 to managing server 16. Relative to a system that uses a monolithic overall test, the independent tests 1) allow greater concurrency in operation; 2) provide scalability as each node has its own copy of the tests; 3) facilitate the addition or replacement of tests; and 4) avail themselves to other management applications and tools.

Figure 2:
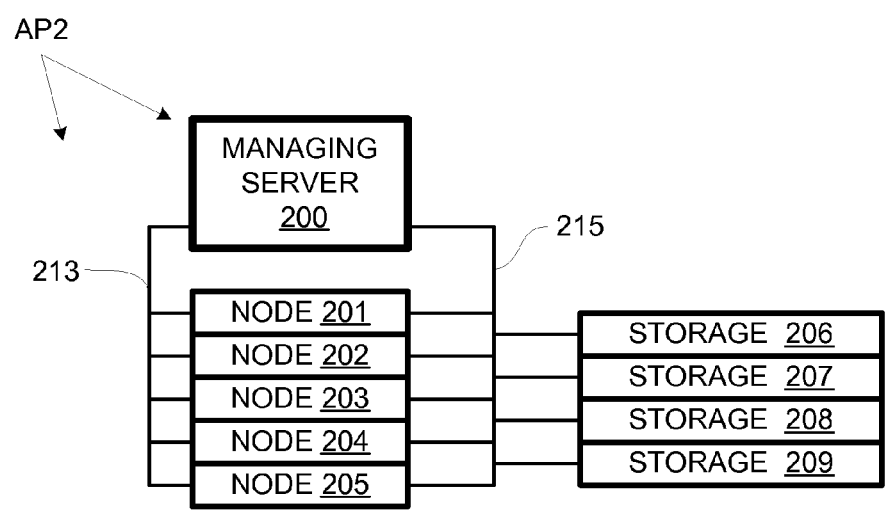
FIG. 2 is a schematic diagram of a managed computer system in accordance with a second embodiment.

In practice, most centrally managed systems include more than one managed node. For example, centrally managed computer system AP2 includes a managing server 200, managed nodes 201, 202, 203, 204, and 205, as well as storage nodes 206, 207, 208, and 209, as shown in FIG. 2. Managed nodes 201-205 can be, for example, a ServiceGuard cluster of HP-UX system nodes among which packages of applications and system resources can freely migrate, e.g., as prompted by system failures or administrator intervention. (ServiceGuard and HP-UX are trademarks as well as products available from Hewlett-Packard Company.) Managing server 200 communicates with nodes 201-205 via a server network 213. Managing server 200 and nodes 201-205 communicate with disk storage 206-209 over a storage area network 215.

Figure 3:
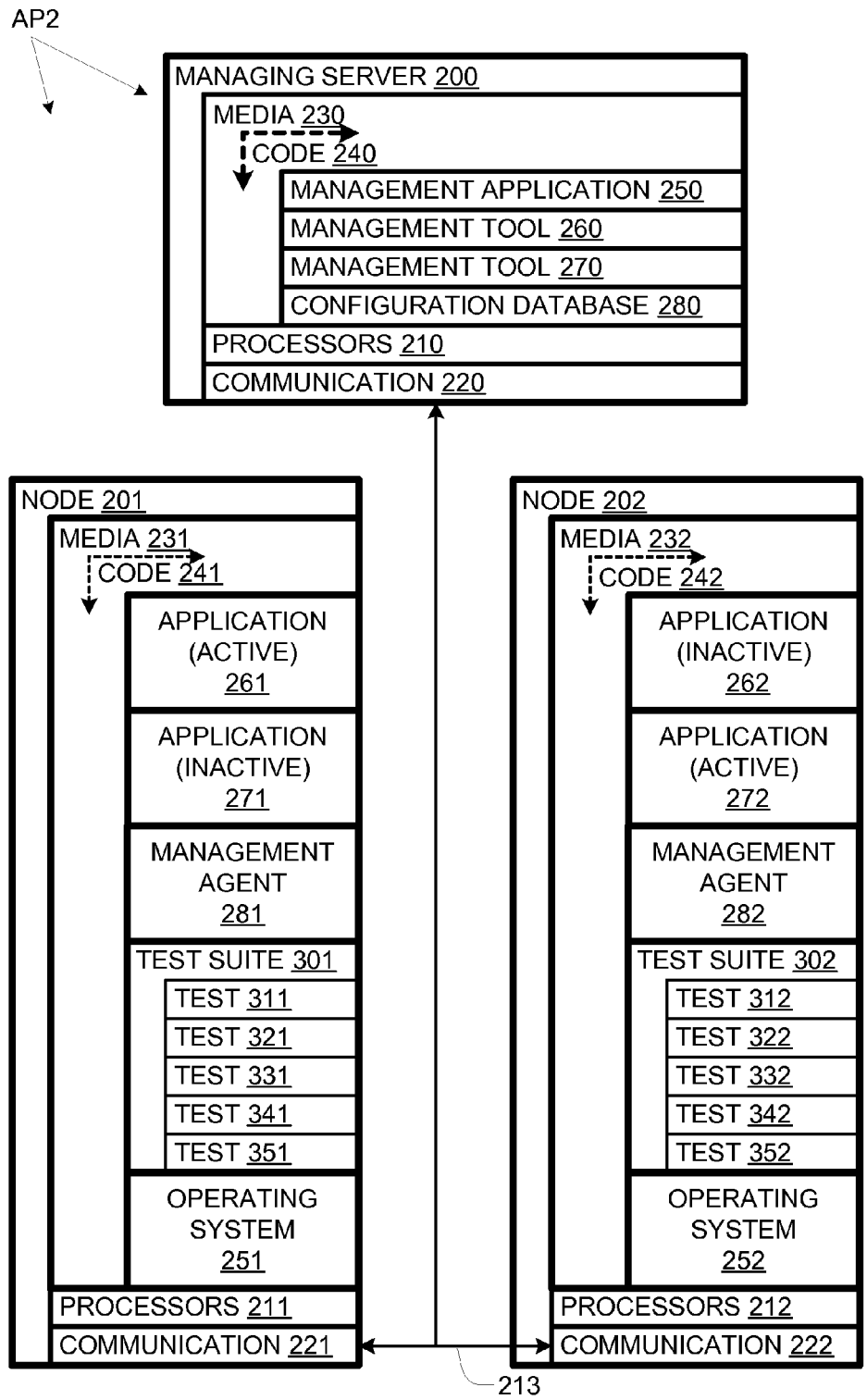
FIG. 3 is a detailed schematic diagram of a portion of the managed computer system of FIG. 2.

Portions of system AP2 are detailed in FIG. 3. Node 201 includes processors 211, communications devices 221 (including network cards and host bus adapters), and computer-readable storage media 231. Code 241 encoded on media 231 provides for several programs including an operating system 251, applications 261 and 271, a management agent 281, and a suite 301 of tests 311, 321, 331, 341, and 351. At the time represented in FIG. 3, application 261 is active (running), while application 271 is inactive (installed but not running).

Node 202 similarly includes processors 212, communications devices 222, and computer-readable storage media 232. Code 242 encoded on media 232 provides for several programs including an operating system 252, applications 262 and 272, a management agent 282, and a suite 302 of tests 312, 322, 332, 342, and 352. At the time represented in FIG. 3, application 262 is inactive, while application 272 is active.

Applications 261 and 262 are two instances of the same application, e.g., a web-server application. Thus, at the time represented in FIG. 3, one instance (261) is active, while the other (262) is inactive. Likewise, applications 271 and 272 are two instances of the same application, e.g., a database application. Thus, at the time represented in FIG. 3, one instance (271) is inactive, while the other (272) is active. Test suites 301 and 302 include corresponding pairs of tests; comparable test suites are installed on nodes 203-205 (FIG. 2). However, in some embodiments, not all tests are included on all nodes.

Tests 311, 312 and their counterparts on other nodes can, for example, determine the hardware configuration of their respective nodes, e.g., to ensure that the hardware suffices to run any planned software. Tests 321 and 322 and their counterparts can, for example, determine the current operating system, version, and configuration. Tests 331 and 332 and their counterparts test for the presence, version, and configuration of the, e.g., web server, application of which applications 261 and 262 are instances. Tests 341 and 342 and their counterparts test of the presence, version, and configuration of the, e.g., database, application of which applications 271 and 272 are instances. If the database application is not present on the local node, tests 271 and 272 can check to see if it is accessible from the respective node 201, 202.

Tests 351, 352, and their counterparts test whether the host managed node has access to a storage unit specified by the triggering command. The storage units involved can be physical disks arrays or logical disk arrays, such as logical volume (LVM) groups, virtual volume (VxVM) groups, or enterprise virtual arrays (EVA). Other tests may test more specifically for network interfaces, memory or processors. Additional hardware connectivity tests can test, for example, directory mount points and network switches. Additional software connectivity tests can test for executable service applications such as an Oracle database client, enterprise software components, and cross-node consistency in configuration files (e.g.,/etc/hosts).

Managing server 200 includes processors 210, communications devices 220, and computer-readable storage media 230. Media 230 is encoded with code 240 defining programs including a management application 250, management tools 260 and 270, and a configuration database 280.

One of the functions of management application 250 is to provide for fail-over of a managed application when the managed node on which it is running fails. For example, if node 202 fails, the database application that had been running thereon can be "migrated" to node 201. Failures can occur, for example, due to loss of connectivity to a shared hardware resource (e.g., an EVA), a hardware fault in a critical system resource (such as a network interface), a local kernel crash, or a software defect or interaction that causes an application to fail. In response, the application can be migrated in part by activating initially inactive application instance on another node, e.g., application 271 on node 201.

Several conditions can affect whether or not the migration is successful. For example, one condition can be the sufficiency of the hardware of node 201 to meet the performance objectives for application 271 and for 261 (assuming that the latter is to continue running); management application 250 can check configuration database 280 to see if it indicates the hardware is sufficient. Running test 311 periodically can ensure the database is up to date and that application 271 will not fail due to insufficient hardware resources. Tests 321, 331, and 341 can ensure compatibility between application 271 and operating system 251 as well as co-running application 261. Test 351 can ensure that the storage location formerly used by application 272 is accessible from node 201. For example, if application 272 accessed a database on disk storage 206, disk storage 206 must be accessible from node 201 if the migration is to succeed. Management application 250 can issue a command to run test 351, with the command specifying disk storage 206 as a test target.

Management application 250 communicates its commands over server network 213 to respective nodes, where the commands are handled by a respective management agent, e.g., 281, 282. The management agent can then launch tests as requested. In an alternative embodiment, commands trigger tests directly, e.g., using a virtual console, without an intervening management agent. Information generated by a test is returned to the management agent or via the respective virtual console to management application 250.

Because the tests are independent, management application 250 can select which tests are to be performed and which are not. Also, tests within a node and on different nodes can readily be run concurrently. Thus, scalability is afforded as tests can be performed on large numbers of nodes concurrently (rather than sequentially).

In addition, since the tests are independent of management application 250, they can be used by other agents including management tools 260 and 270. Also, they can be triggered by a program running on the respective node or manually, e.g., via an actual or virtual console. For example, management tool 260 can be a power management tool that uses tests 311, 312, and their counterparts to check the hardware configuration to determine what devices can be powered down to save power or power up to increase performance. For another example, management tool 270 can be an update management tool that uses tests 321 and 322 to check the operating system, version, and configuration prior to updating. Tools 260 and 270 can access tests 311-351 and 312-352 without involving management application 250.

Figure 4:
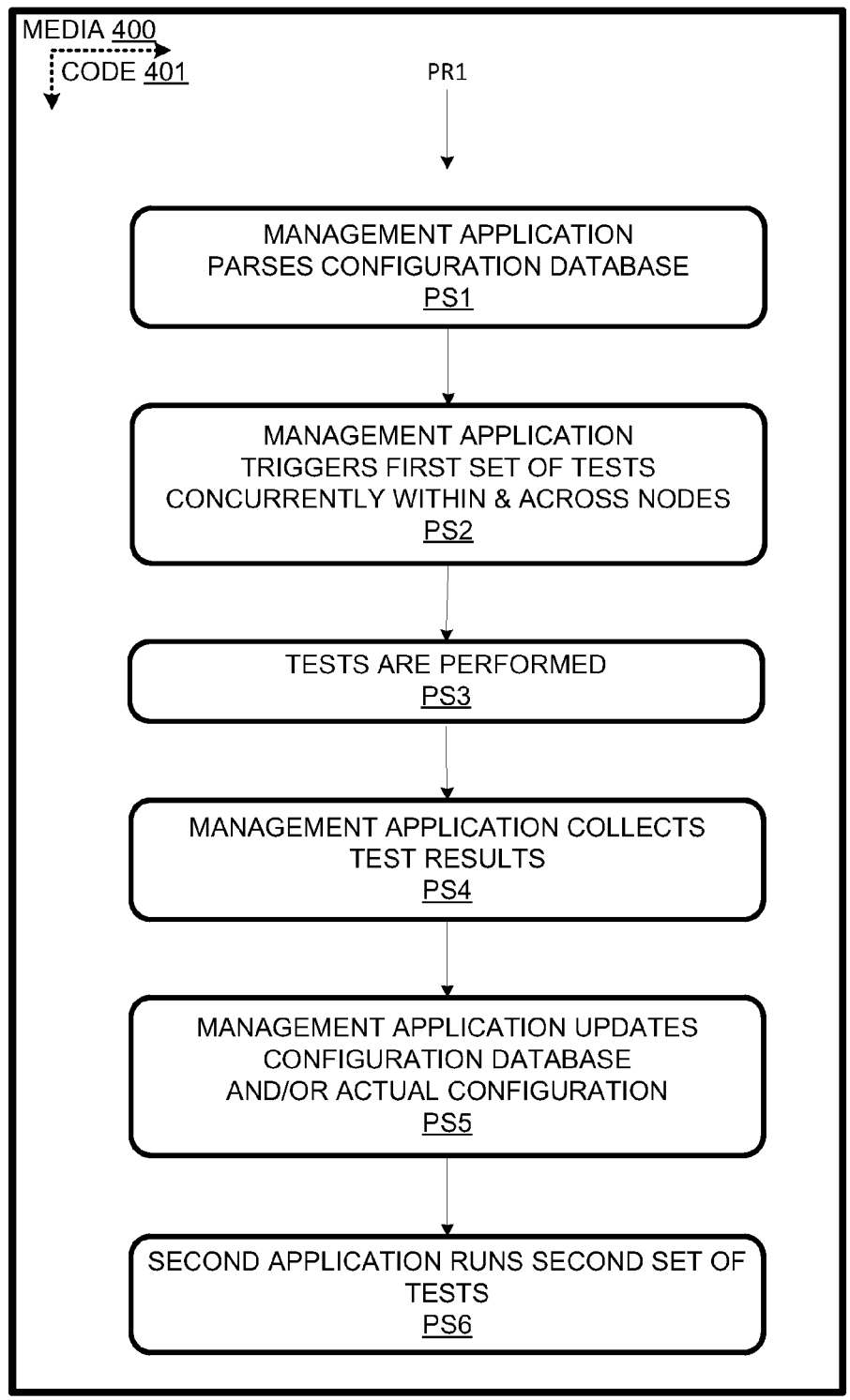
FIG. 4 is a flow chart of a management process in accordance with a process embodiment.

A process PR1 implemented on system AP2 is flow charted in FIG. 4, which is implemented by code 401 on distributed computer-readable storage media 400. At process segment PS1, a managing server or, more specifically, a management application or tool running on a managing server, parses a configuration database for pertinent configuration data. For example, the data may indicate that a managed application, e.g., application 272, is configured to run on any of nodes 201, 202, and 203 and requires access to storage unit 206, which can be, for example, a VxVM disk group. It would be desirable to know that storage unit 206 is accessible from all three of these nodes.

Accordingly, the management application issues a test command at process segment PS2 for tests 351, 352 and their counterpart on node 203 to be performed. Before or as part of the command, the management application can transmit the identity of the storage units to which access is to be tested. In the example, a suitable value for storage unit 206 is transmitted to nodes 201-203.

The tests are then run on their respective nodes concurrently at process segment PS3. The tests can involve collecting configuration and other management-related data from hardware and software accessible by the node. In the example, the tests indicate, for each of nodes 201-203, whether storage unit 206 can be accessed.

The test programs return their respective results to the management application, which collects the results at process segment PS4. The results can be compared with the configuration data from the configuration database. If there is a mismatch, some further action may ensue. For example, at process segment PS5, the management application can take some action to reconfigure the node or to provide the access indicated in the database. Alternatively, the database can be updated to indicate the actual configuration or accessibility. In some cases, both the database and the node configuration/environment are updated.

There can be more than one management application or tool running on a managing server. In that case, one management application can be responsible for the process as described above. In that case, a second management application on the managing server or elsewhere, can command or request one or more tests be run on one or more nodes at process segment PS3. The set of tests triggered by the second application can be a non-exhaustive subset of or overlap that requested by the first management application.

Since the tests are loosely coupled to the parent application (e.g., management application 250) they can readily be reused by other products, tools, and applications. For the same reason, the tests can be readily distributed to new nodes. Implementing logic to perform only a subset of an entire configuration check is facilitated by the granular nature of the low-level checking. Since the configuration database checking process is broken down into fine elements, the tests can be readily parallelized locally and across multiple nodes.

Herein, a "test executable" is a file or script that, when executed, causes a test to be performed. Herein, a "system" is a set of interacting elements, wherein the elements can be, by way of example and not of limitation, mechanical components, electrical elements, atoms, instructions encoded in storage media, and process segments. In this specification, related art is discussed for expository purposes. Related art labeled "prior art", if any, is admitted prior art. Related art not labeled "prior art" is not admitted prior art. The illustrated and other described embodiments, as well as modifications thereto and variations thereupon are within the scope of the following claims.

What is claimed is:

1. A managing server system comprising:
   at least one communication device to communicate with plural managed nodes that comprise non-transitory computer-readable storage media encoded with plural test executables for running on the respective plural managed nodes for checking configuration data of the respective managed nodes, the configuration data indicating for each respective managed node of the plural managed nodes,
  a hardware configuration for the respective managed node,
  an external storage unit accessible by the respective managed node, and
  software installed on or software accessible by the respective managed node; and
at least one processor to:
  command the test executables to execute concurrently on the plural managed nodes,
  collect test results returned by the test executables in response to the commanding, the test results including the configuration data of the plural managed nodes,
  determine based on the test results whether a first managed node of the plural managed nodes is a suitable fail-over target for an application that was executing on a second managed node of the plural managed nodes; and
  in response to the determining indicating that the first managed node is a suitable fail-over target for the application, cause execution of an instance of the application on the first managed node responsive to detecting failure of the second managed node.

2. The managing server system as recited in claim 1, further comprising a storage medium to store a configuration database,
  wherein the at least one processor is to compare the test results returned by the test executables with data in the configuration database.

3. The managing server system as recited in claim 1, wherein at least one of the test executables determines whether an external software service is accessible from a managed node on which the at least one test executable runs.

4. The managing server system as recited in claim 1, further comprising a storage medium to store code comprising:
  a management application to command execution of the test executables.

5. The managing server system as recited in claim 1, wherein the determining of whether the first managed node is a suitable fail-over target for the application is based on the configuration data in the test results indicating that a particular external storage unit containing data to be accessed by the application is accessible by the first managed node.

6. The managing server system as recited in claim 5, wherein the at least one processor is to send an identity of the particular external storage unit as part of the commanding of the test executables.

7. The managing server system as recited in claim 1, wherein the determining of whether the first managed node is a suitable fail-over target for the application is based on the configuration data in the test results indicating that the first managed node has hardware resources or software resources compatible with the application.

8. The managing server system as recited in claim 1, further comprising management instructions executable on the at least one processor to:
  determine, from the configuration data in the test results, devices of the plural managed nodes to power down or power up to perform power management.

9. The managing server system as recited in claim 1, wherein the at least one processor is to:
  reconcile the test results with a configuration database by performing at least one of:
    updating the configuration database according to the test results, and
    updating a configuration of at least one of the plural managed nodes according to configuration data in the configuration database.

10. A method comprising:
  issuing, by a managing server including a processor, commands to run plural independent test executables on plural managed nodes;
  receiving, by the managing server, test results from the test executables run on the plural managed nodes in response to the commands, the test results specifying, for each respective managed node of the plural managed nodes, hardware of the respective managed node, an external storage unit accessible by the respective managed node, and software installed on or accessible by the respective managed node;
  determining, by the managing server, based on the test results whether a first managed node of the plural managed nodes is a suitable fail-over target for an application that was executing on a second managed node of the plural managed nodes; and
  in response to the determining indicating that the first managed node is a suitable fail-over target for the application, cause execution of an instance of the application on the first managed node responsive to detecting failure of the second managed node.

11. The method as recited in claim 10, further comprising comparing, by the managing server, the test results with data in a configuration database.

12. The method as recited in claim 11, further comprising, in response to the comparing indicating a mismatch between the test results and the data in the configuration database, performing at least one of:
  updating a configuration of at least one of the plural managed nodes, and
  updating the configuration database.

13. The method as recited in claim 11 further comprising, before issuing the commands, parsing the data in the configuration database to determine which of the test executables to run.

14. The method as recited in claim 10, wherein determining whether the first managed node is a suitable fail-over target for the application is based on the test results indicating that a particular external storage unit containing data to be accessed by the application is accessible by the first managed node.

15. The method as recited in claim 10, wherein determining whether the first managed node is a suitable fail-over target for the application is based on the test results indicating that the first managed node has hardware resources or software resources compatible with the application.

16. The method as recited in claim 10, further comprising:
  in response to the test results, performing at least one of:
    update a configuration database so that the configuration database matches configurations of the plural managed nodes, and
    reconfiguring at least one of the plural managed nodes according to configuration data in the configuration database.

17. A non-transitory computer readable storage medium storing instructions that, when executed, cause a managing server to:
  command test executables to run concurrently on plural managed nodes;
  receive test results from the test executables run on the plural managed nodes in response to the commanding, the test results indicating, for each respective managed node of the plural managed nodes, hardware installed on the respective managed node, an external storage unit accessible by the respective managed node, and software installed on or accessible by the respective managed node;

determine based on the test results whether a first managed node of the plural managed nodes is a suitable fail-over target for an application that was executing on a second managed node of the plural managed nodes; and in response to the determining indicating that the first managed node is a suitable fail-over target for the application, cause execution of an instance of the application on the first managed node responsive to detecting failure of the second managed node.

18. The non-transitory computer readable storage medium as recited in claim 17, wherein determining whether the first managed node is a suitable fail-over target for the application is based on the test results indicating that a particular external storage unit containing data to be accessed by the application is accessible by the first managed node.

19. The non-transitory computer readable storage medium as recited in claim 18, wherein determining whether the first managed node is a suitable fail-over target for the application is further based on the test results indicating that the first managed node has hardware resources and software resources compatible with the application.

20. The non-transitory computer readable storage medium as recited in claim 17, wherein the instructions when executed cause the managing server to:

compare the test results with configuration data in a configuration database;

in response to a mismatch in the comparing, perform at least one of:

update a configuration of at least one of the plural managed nodes according to the configuration data in the configuration database, and update the configuration data in the configuration database according to the test results.

* * * * *